Figure 1:
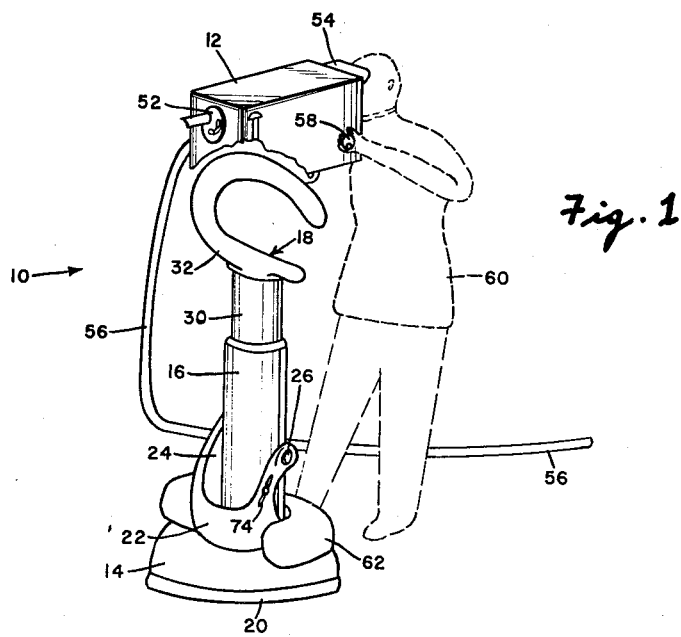

Jan. 5, 1960

J. F. PLAIN 2,919,876

ADJUSTABLE CAMERA STAND

Filed Oct. 26, 1954

2 Sheets-Sheet 1

INVENTOR
JOHN F. PLAIN

BY

ATTORNEYS

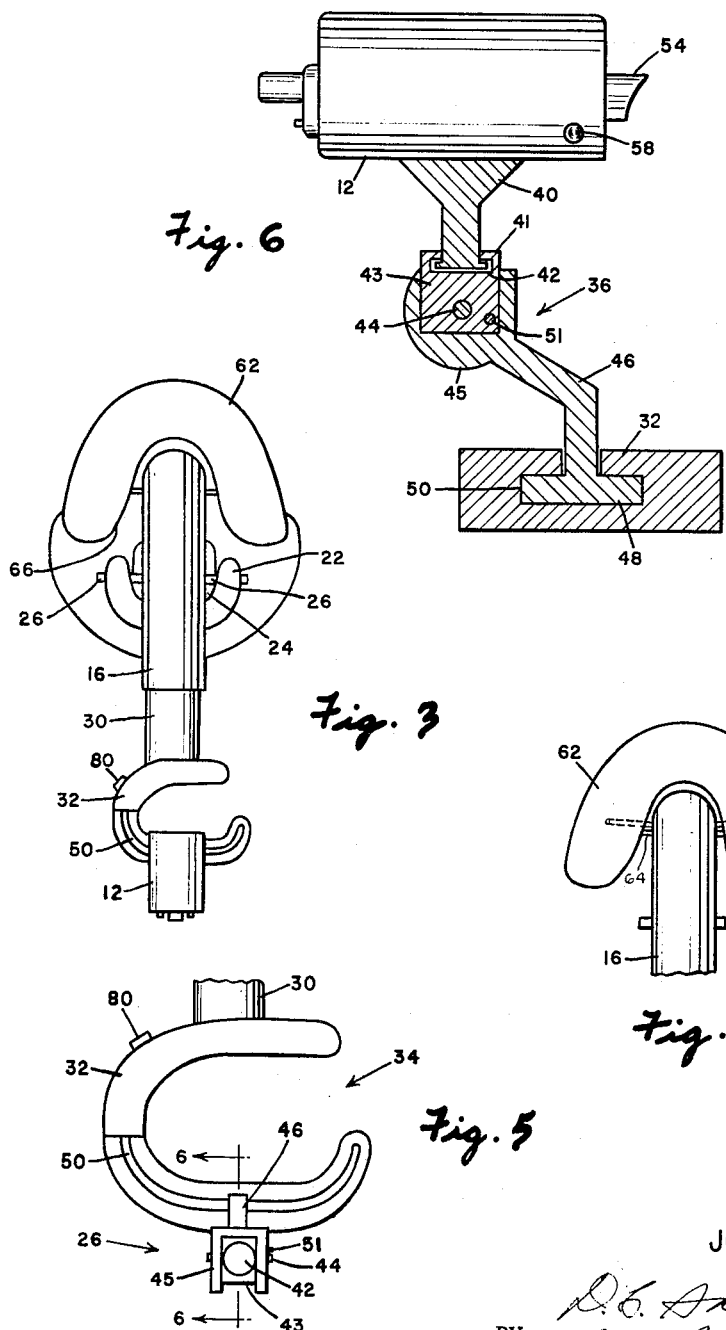

United States Patent Office 2,919,876
Patented Jan. 5, 1960

2,919,876

ADJUSTABLE CAMERA STAND

John F. Plain, Red Bank, N.J.

Application October 26, 1954, Serial No. 464,917

4 Claims. (Cl. 248—123)

(Granted under Title 35, U.S. Code (1952), sec. 266)

The invention described herein may be manufactured and used by or for the Government of the United States of America for governmental purposes without the payment of any royalties thereon or therefor.

The invention relates to a stand for cameras and is designed to be adjustable in both extremes of high and low positions to allow a greater angle and area of operation, whereby the cameraman can move his camera as desired to and from the subject.

In photography, interest in the subject is intensified by the use of unusual pictures. These may be obtained by taking the picture from a particular angle. This is especially true of motion pictures or in the use of the camera for television. However, the equipment required to mount the commercial camera, whether for motion pictures or for television, is bulky and cumbersome and determines just how close the cameraman could move the camera head to the object to be photographed or televised. At present, a tripod or solid base commercial camera permits the camera head to tilt down at an angle of about 45°. Also, the distance from the floor of low angle shots is limited by the stand construction, thereby preventing desired effects. In addition, movement of the camera and stand is by hand pushing and pulling, a procedure that induces quick fatigue and limits hand use.

The invention is designed to overcome these shortcomings and the cameraman is able to obtain a greater diversity of camera shots, both still and panoramic, as well as eliminate cumbersome equipment from the front of the camera. The angle of tilt has a much greater range and the camera is moved by the body of the technician to avoid the more tiring use of the hands, leaving the hands free to perform other operations.

A primary object of the invention is to provide a camera stand that will enable the cameraman to obtain a greater diversity of camera shots, both still and panoramic, by allowing the camera to be moved higher or lower, as desired.

Another important object of the invention is to provide a camera stand that is easy to move about, whereby the operator will not become fatigued from the effort.

Still another important object of the invention is to provide a camera with the weight and bulk thereof behind the operator to avoid a concentration of weight directly under the camera head. In this manner, adjustment of the camera is easy.

It is still a further object of the invention to provide a camera stand that will be perfectly balanced in both the upright and the horizontal position.

It is another object of the invention to reduce the bulk of the device by combining the elements so as to provide a compact unit.

A feature of the invention resides in the use of a turret by which the cameraman can operate the device with his body and leave his hands free to actuate the camera.

Another feature of the invention is in the use of a weight for the stand, this weight being hollow and housing the heavy components, such as transformers, etc., whereby the stand is balanced and the overall bulk of the device is made more compact.

Still another feature of the invention is in the use of pivot means to bring the camera support into a position adjacent the floor whereby the cameraman may operate the camera while in a prone position.

Figure 2:
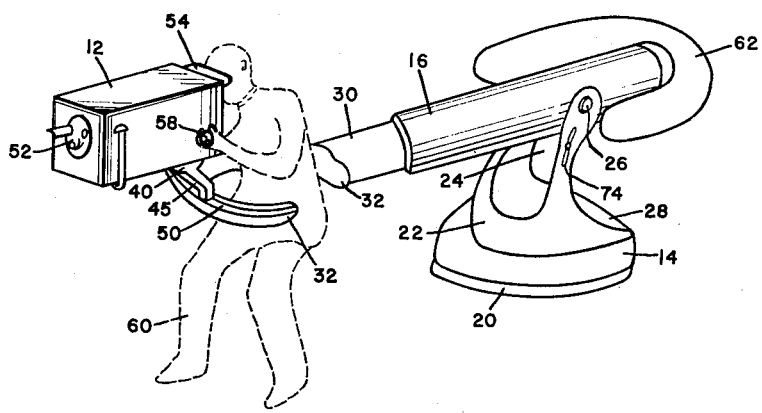

Other objects and many of the attendant advantage of this invention will be readily appreciated as the same becomes better understood by reference to the following detailed description when considered in connection with the accompanying drawings wherein:

Fig. 1 is a perspective view of the adjustable camera stand of the invention in vertical position, Fig. 2 is a perspective view of the adjustable camera stand in horizontal position, Fig. 3 is a top plan view of the camera stand as illustrated in Figure 2, Fig. 4 is a bottom view of the balancing weight of the adjustable camera stand.

Fig. 5 a plan view of the track means of the camera support with the camera not shown, and Fig. 6 is a sectional view taken on line 6—6 of Fig. 5.

Referring to the figures of the invention, an adjustable television camera carriage 10 has mounted thereon for movement, the usual camera 12. Camera carriage 10 comprises a base or stand 14, boom 16 and camera support 18.

Stand or dolly 14 is constructed of a generally circular heavy base, supported on wheels with wheel guards that can be locked. The wheels are generally concealed from view by skirt portion 20 of the base. Such structure is conventional and need not be further illustrated or described in detail. Vertical post 22 is retained within base member 14 and is mounted for 360 degree rotation thereon. In addition, a deeply recessed cutout or valley 24, within vertical post 22 is adapted to pivotally receive a balanced boom 16. Pivot pins 26 support boom 16 on post 22 whereby the television camera may be supported in the vertical position illustrated in Figure 1, or may be swung to the horizontal position shown in Figure 2. Obviously, boom 16 may be pivoted closer to floor level, depending upon the limitations of valley 24. A recess 28 in support post 22 is adapted to receive the lower end of boom 16 when it is in vertical position, post 22 also serving as a stop means when the boom is held vertically.

Camera support 18 is provided with an extension member or shaft 30. Member 30 is telescopically received within boom 16 which is provided with hydraulic means (not shown) to raise and lower the camera support. Extending from the exposed end of member 30 is a turret 32, which is similar to an aircraft gunner's turret, with approximately ninety degrees of one side open at 34 to receive the cameraman (see Fig. 2), and by which he can readily manipulate the device, as will soon appear.

It is obviously advantageous for the camera to be adjustable to any desired elevation and at the same time be turnable horizontally in any degree of rotation desired. This is readily accomplished by the swivel means 36 and panoramic construction 38 of the turret element 32, illustrated in Figures 3, 5, and 6. Camera 12 contains a depending inverted frustoconical mount 40 having an annular rim 41 which is adapted to be retained in an annular groove 42 of stud 43. Stud 43 is retained far pivotal movement about a horizontal axis by means of a transverse pivot pin 44 extending between the arms of a forked support 45. Stem 46 depends from the forked support 45 and merges into an enlargement 48 which rides in an arcuate track 50 on one side of turret panoramic section 32. In the form illustrated in the figures, the track is arcuate in construction and represents a 180 degree segment of a circle. In this manner, a horizontal panorama of 90 degrees to either side of center is provided, while post 22 itself will allow additional horizontal panorama up to a 360 degree sweep. Rim or flange 41 of mount 40 is retained in the grooved seat 42 so that camera 12 may be individually rotated through a 360 degree circle in a perfectly horizontal plane with respect to stud 43. Stud 43 is pivoted about pin 44 to move the camera in a vertical arc. Thus, any desired angle of tilt for the camera is possible. When the camera is pivoted to the desired angle, locking means 51 which may be in the form of the well known spring pressed pin, extending through support 45 and engaging stud 43, maintains the camera in position.

The camera itself may be of conventional design and is depicted for illustrative purposes as a television camera 12 with the conventional lens 52, eye piece 54, cable 56 and focusing control 58, controlled by a cameraman 60. Other cameras may be substituted if desired.

The weight of camera 12 is counter-balanced by a weight 62 pivotally mounted at 64 adjacent the rear end of boom 16. Counterweight 62 is constructed to serve the dual function of balancing the camera and storing some of the heavy equipment necessary to operate the device. Counterweight 62 is composed of a hollow shell and can receive such components as transformers, etc., to provide better utility for the counterweight, while eliminating the bulk from other locations where they would interfere with operations. The hollow shell construction allows weight to be added or removed, as required, depending on the size of the camera being used. Counterweight 62 is U-shaped in construction with the free arms thereof indented or recessed at 66 to conform to the shape of the lower portion of post 22. Thus, when the camera stand assumes the vertical position of Fig. 1, weight 62 is flush against the base or stand. When the boom is swung to the horizontal position of Fig. 4, weight 62 is balanced in such manner, that it swings to and remains horizontal at any angular position of boom 62. The stop pins 68 extend from the boom 16 laterally, as is shown in Figure 4, and arrest the continued downward motion of the weight 62 when the boom is swung from vertical (Figure 1) to horizontal (Figure 4) position. When the weight is engaged by the pins 68, the boom 16 and weight 64 remain in the same plane to balance the camera. With the ability to vary the weights used, a perfect balancing action is obtained at all times. In this construction, the major portion of the weight and bulk of a camera carriage is behind the cameraman, thereby allowing the camera to be more readily manipulated. This form of construction is of great importance and effects a great contribution in obtaining ease of manipulation, as well as in reducing the number of men required. In the normal operation of a dolly, two men are required. One operates the camera and the other pushes the dolly around to desired positions. By placing the bulk of the equipment behind the operator and by the provision of turret 32, he can now remain on the ground, rather than in a seat on the dolly itself. Also, he uses the trunk of his body, which remains in the turret, to push the carriage and stand to required locations. The second man, or dolly pusher, is no longer needed.

If desired, boom 16 may be fixed in any angle of elevation by means of a wing screw 74 threaded through the post 22 and adjustable against the boom 16 to frictionally engage this boom and hold it in the desired angular position with respect to the post. Other means to hold the boom in adjusted position may be substituted.

A simplified construction, which is effective, permits the elimination of panoramic track 50 with the camera then mounted directly on the top of turret 32 by means of the swivel arrangement 36. Also, turret 32 may assume an open, rectangular shape. This form is similar to that illustrated, except that track 38 is eliminated.

The cameraman is positioned forward of the base and boom structure. In operation, the cameraman is positioned within turret 32 and can readily grasp control member 58 of camera 12 for operation thereof. By virtue of this construction, the operator is in a position to move the entire camera carriage with the trunk of his body, leaving both hands free and permitting him to give his undivided attention to the subject being televised or photographed. Since the greater weight is behind him, rather than directly under the camera head as is true of present stand or tripod equipment, the cameraman can move the carriage with little effort. Counterweight 62 helps balance the weight of the camera and carriage to ease manipulation thereof by being held in co-planar relation with the boom 16 when in substantially a horizontal position. Post 22 rotates in a 360 degree circle and the cameraman can accomplish this by merely pushing against the turret section. Vertical panning of the camera is obtained by the pivot connection 26. Boom 16 can be locked in any position by means of set screw 74, or by means of a control located at switch 80. At the same time, a 90 degree panorama from center in a horizontal plane is obtained by moving camera 12 in track 50. Also, by means of swivel connection 36, camera 12 may itself be swung through a 360 degree rotation. By means of switch 80, secured where convenient on the turret, the hydraulically actuated shaft 30 is extended or retracted. By placing the switch at the turret, the cameraman can operate the hydraulic means with his free hand, both from the upright position and from the horizontal position. In addition, switch 80 may be provided with a lock switch to lock the boom in any angular position, thereby avoiding the necessity for the mechanical stop means 74. Switch 80 may also be used to lock the camera base wheels and to lock rotation post 22. This differs from the foot operation of standard equipment which restricts the cameraman to remaining close to the camera carriage. When boom 16 is in the horizontal position illustrated in Fig. 2, the telescoping shaft 30 is in the extended position. The cameraman is then free to operate at a considerable distance from base 14. Thus, there is no possibility for the base interfering with the movements of the operator. The vertical panorama has a range of from almost floor level to a height of about ten feet. The rotation of the boom support 22 and the camera itself provide for large and small circular panoramic effects. Track 50 also aids in this respect.

When in horizontal position, counterweight 62 is also horizontal to balance the device and when in vertical position, counterweight 62 fits on base 14 without being in the way. Low angled shots are now possible without requiring the camera to be removed from the carriage and placed in a fixed position. Because of the extended arm construction, the cameraman may kneel, crouch, or lay prone to operate the camera from these positions.

Obviously many modifications and variations of the present invention are possible in the light of the above teachings. It is therefore to be understood that within the scope of the appended claims the invention may be practiced otherwise than as specifically described.

What is claimed is:

1. An adjustable camera carriage and stand comprising a base, a post rotatably secured on said base, a boom pivotably mounted on said post, a turret co-planar with said boom and extending therefrom, said turret having one side open and adapted to contact the body portion of the cameraman, whereby the cameraman can move the boom by his body only and both hands are free to operate the equipment, a track member extending on the upper surface of said turret and means operably retained in said track member for movement thereon, said means being adapted to retain a camera.

2. An adjustable camera carriage and stand comprising a base, a post rotatably mounted on said base, a boom pivotably mounted on said post, a turret co-planar with said boom and extending therefrom, said turret having one side open and adapted to contact the body portion of the cameraman, whereby the cameraman can move the boom by his body only and both hands are free to operate the equipment, a track member extending on the upper surface of said turret and means operably retained in said track member for movement thereon, said means being an angled stem member retained in said track and extending upwardly therefrom, support means on said stem, a stud member mounted in said support means for pivotal movement about a horizontal axis, and means secured on said stud to mount a camera for 360° rotation.

3. An adjustable camera carriage and stand comprising a base, a post rotatably mounted on said base, a boom pivotably mounted on said post, a turret co-planar with said boom and extending therefrom, said turret having one side open and adapted to receive the body portion of the cameraman, whereby the cameraman can move the boom by his body only and both hands are free to operate the equipment, a track member extending on the upper surface of said turret and means operably retained in said track member for movement thereon, said means being an angled stem member retained in said track and extending upwardly therefrom, support means on said stem, a stud member mounted in said support means for pivotal movement about a horizontal axis, and means secured on said stud to mount a camera for 360° rotation, said last named means comprising a camera mount having an angular rim and an angular groove in said stud receiving the angular rim therein.

4. An adjustable camera carriage and stand comprising a support, a telescopic boom pivotably secured on said support, a counterweight mounted at one end of said boom a turret co-planar with said boom extending therefrom, said turret having one side open and adapted to receive the body portion of a cameraman, whereby the cameraman can move the boom by his body only, said counterweight being hollow in construction and adapted to receive balancing weights therein, pin means extending from said boom between the counterweight and the support to retain the counterweight and boom in axial alignment when in the horizontal position so that the entire weight of the carriage is behind the cameraman and means to mount a camera provided in said turret.

References Cited in the file of this patent

UNITED STATES PATENTS

| | | |
|---|---|---|
| 153,827 | Holman | Aug. 4, 1874 |
| 454,166 | Dillon | June 16, 1891 |
| 1,190,187 | Olsson | July 4, 1916 |
| 1,774,775 | Weitz | Sept. 2, 1930 |
| 1,855,964 | Higginbotham | Apr. 26, 1932 |
| 1,887,801 | Cole | Nov. 15, 1932 |
| 1,935,246 | Kirsch | Nov. 14, 1933 |
| 1,942,925 | Jenkins | Jan. 9, 1934 |
| 2,073,998 | Roby | Mar. 16, 1937 |
| 2,224,901 | Cunningham | Dec. 17, 1940 |
| 2,306,562 | Phillips | Dec. 29, 1942 |
| 2,318,348 | Webb | May 4, 1943 |
| 2,391,795 | Oliver | Dec. 25, 1945 |
| 2,432,058 | Wiken et al. | Dec. 2, 1947 |
| 2,447,667 | Roby | Aug. 24, 1948 |
| 2,776,102 | Schlafly | Jan. 1, 1957 |

FOREIGN PATENTS

| | | |
|---|---|---|
| 649,140 | Germany | Aug. 18, 1937 |
| 742,471 | France | Dec. 27, 1932 |